United States Patent
Oriol et al.

(10) Patent No.: US 12,467,409 B2
(45) Date of Patent: Nov. 11, 2025

(54) HEAT EXCHANGER MOUNTED IN A TURBINE ENGINE CAVITY

(71) Applicant: SAFRAN AIRCRAFT ENGINES, Paris (FR)

(72) Inventors: Sébastien Oriol, Moissy-Cramayel (FR); Nicolas Vincent Pierre-Yves Cotereau, Moissy-Cramayel (FR); Mohammed-Lamine Boutaleb, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/256,200

(22) PCT Filed: Dec. 7, 2021

(86) PCT No.: PCT/FR2021/052226
§ 371 (c)(1),
(2) Date: Jun. 6, 2023

(87) PCT Pub. No.: WO2022/123168
PCT Pub. Date: Jun. 16, 2022

(65) Prior Publication Data
US 2024/0018904 A1    Jan. 18, 2024

(30) Foreign Application Priority Data
Dec. 11, 2020    (FR) ...................................... 2013107

(51) Int. Cl.
*F02C 7/14*    (2006.01)
*F02C 7/18*    (2006.01)

(52) U.S. Cl.
CPC ................. *F02C 7/18* (2013.01); *F02C 7/14* (2013.01); *F05D 2260/213* (2013.01)

(58) Field of Classification Search
CPC ............... F02K 3/105; F02C 7/18; F02C 7/14
See application file for complete search history.

(56) References Cited

U.S. PATENT DOCUMENTS

| | | | | |
|---|---|---|---|---|
| 2,896,919 A | * | 7/1959 | Teague, Jr. ............... | F01P 11/08 236/34.5 |
| 3,756,280 A | * | 9/1973 | Parquet ................... | F16K 11/07 137/625.25 |

(Continued)

FOREIGN PATENT DOCUMENTS

| | | |
|---|---|---|
| EP | 2 492 199 A2 | 8/2012 |
| EP | 3 453 845 A1 | 3/2019 |

OTHER PUBLICATIONS

International Search Report mailed Mar. 10, 2022, issued in corresponding International Application No. PCT/FR2021/052226, filed Dec. 7, 2021, 5 pages.

(Continued)

*Primary Examiner* — Devon C Kramer
*Assistant Examiner* — Roberto Toshiharu Igue
(74) *Attorney, Agent, or Firm* — Christensen O'Connor Johnson Kindness PLLC (57) ABSTRACT

A heat exchange system for a turbine engine is provided. The heat exchange system includes a cavity having an air intake, a heat exchanger arranged in the cavity and having a first circuit in which a first fluid can circulate, a movable flap mounted at the air intake and moving between two positions permitting or preventing, respectively, the circulation of air flow in the cavity, and a control device having a movable member configured to drive the movement of the movable flap. The control device can be arranged in the heat exchanger supply circuit and configured so as to permit or prevent the circulation of the first fluid to the heat exchanger and simultaneously move the movable flap between at least one of the two positions.

19 Claims, 3 Drawing Sheets

(56) References Cited

U.S. PATENT DOCUMENTS

| | | | | |
|---|---|---|---|---|
| 6,823,935 | B1* | 11/2004 | Arold | B60H 1/00064 |
| | | | | 165/203 |
| 8,397,487 | B2* | 3/2013 | Sennoun | F02C 6/08 |
| | | | | 60/785 |
| 10,677,166 | B2* | 6/2020 | Pesyna | F02K 3/06 |
| 2015/0044036 | A1* | 2/2015 | Fitzpatrick | F02C 7/14 |
| | | | | 184/6.1 |
| 2017/0159490 | A1* | 6/2017 | Sennoun | F02K 3/06 |
| 2019/0390602 | A1 | 12/2019 | Potel et al. | |

OTHER PUBLICATIONS

Written Opinion mailed Mar. 10, 2022, issued in corresponding International Application No. PCT/FR2021/052226, filed Dec. 7, 2021, 7 pages.

\* cited by examiner

HEAT EXCHANGER MOUNTED IN A TURBINE ENGINE CAVITY

CROSS-REFERENCE TO RELATED APPLICATIONS

This application is a National Stage of International Application No. PCT/FR2021/052226, filed Dec. 7, 2021, which claims priority to French Patent Application No. 2013107, filed Dec. 11, 2020, the entire disclosures of which are hereby incorporated by reference in their entirety for all purposes.

FIELD OF THE INVENTION

The present invention relates to the general field of the aeronautic. In particular, it refers to a heat exchange system comprising a heat exchanger which is buried in a cavity of a turbine engine. The invention also relates to the turbine engine and the method for implementing the heat exchange system.

TECHNICAL BACKGROUND

A turbine engine, in particular for an aircraft, comprises various members and/or items of equipment that need to be lubricated and/or cooled, such as rolling bearings and gears. The heat released by these components, which can be very high depending on the power of the member and/or the item of equipment, is transported by a fluid and evacuated towards cold sources available in the aircraft.

It is known to equip the turbine engine with one or more heat exchangers to carry out the heat exchange between the fluid (typically oil) and the cold source (air, fuel, etc.). There are different types of heat exchangers, for example the fuel/oil heat exchangers, generally referred to as Fuel Cooled Oil Cooler for FCOC, and the air/oil heat exchangers, referred to as Air-Cooled Oil Cooler for ACOC. These are usually installed in addition to the FCOC exchangers, which are insufficient to meet the growing need for fluid cooling in the turbine engine. Examples of heat exchangers are described in the patent documents EP-A2-2492199, US-A1-2019/390602, and EP-A1-3453845.

The family of the ACOC exchangers also comprises the surface-type exchangers, known by the acronym SACOC for "Surface Air-Cooled Oil Cooler", which are generally arranged in the secondary duct of the turbine engine and use the secondary airflow to cool the oil circulating in the turbine engine. However, the SACOC heat exchangers usually comprise fins that continuously disturb the airflow and create additional pressure losses in the secondary duct. This affects the performance of the turbine engine as well as the specific fuel consumption.

Figure 1:
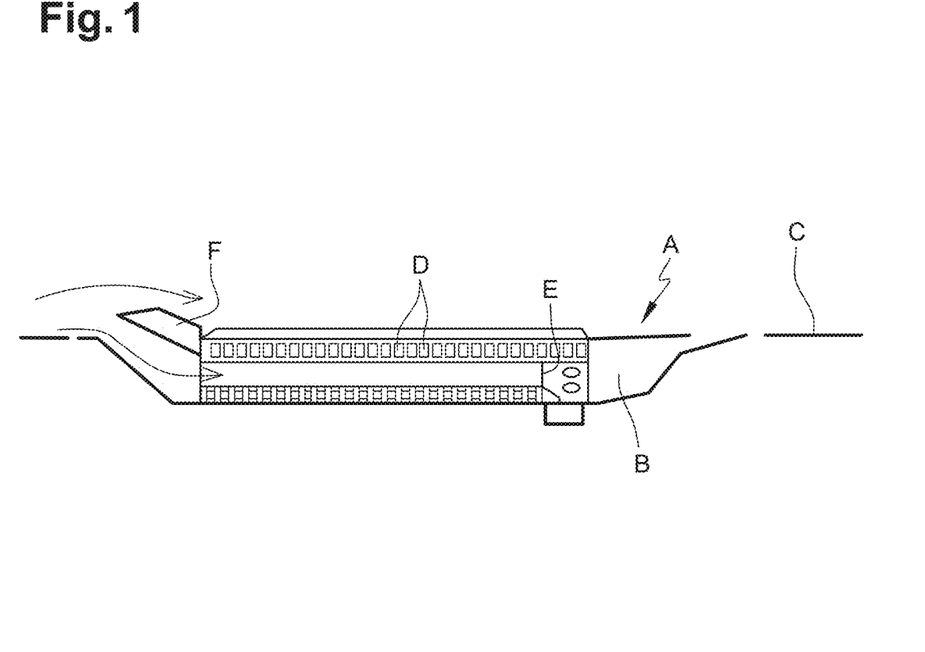
FIG. 1 is an axial cross-sectional view of an example of a heat exchanger that is mounted in a cavity of a turbine engine according to the prior art.

To overcome these disadvantages, some heat exchangers are buried in a compartment of the turbine engine. As illustrated in FIG. 1 of the prior art, a heat exchanger A is integrated in a cavity B opening into a radially internal wall C of the secondary duct. A portion of the secondary airflow, collected from the secondary duct, passes through the buried heat exchanger A where it is reheated and reinjected into the secondary duct. The heat exchanger A is in the form of a metallic surface part allowing the passage of oil in machined channels D and carrying fins E which are intended to be passed through by the secondary airflow. A driven scoop F, formed for example by a movable flap pivoting and/or displaceable in translation, is arranged at the level of the entrance of the cavity B so as to extend into the secondary duct and to provide an adjustable air flow rate towards the buried heat exchanger A. An example of this heat exchanger is described in the patent application EP-A1-2472067.

The movable flap of the scoop F can generate pressure losses in the secondary duct when it is open. The movable flap is driven so that it closes when there is no need for heat exchange in the buried heat exchanger. In the closing position of the movable flap, the hot oil continues to circulate inside the heat exchanger, heating all the air trapped in it (the airflow is almost trapped if the movable flap is in the closing position) and in the cavity. The heated airflow is discharged into the secondary duct. The continuously circulating hot oil can shorten the service life of the heat exchanger and the performance of the turbine engine is degraded. A thermal cycling is operated on every flight even if the heat exchanger is not used to cool the oil.

There is therefore a need to overcome the above-mentioned disadvantages.

SUMMARY OF THE INVENTION

The objective of the present invention is to provide a heat exchange system that allows to optimise the integration of a heat exchanger in a cavity and reduces the pressure losses while maintaining the performance of the turbine engine throughout its operation.

This is achieved in accordance with the invention by a heat exchange system for an aircraft turbine engine comprising:
- a cavity comprising an air intake,
- a heat exchanger arranged in the cavity, the heat exchanger comprising a first circuit in which a first fluid provided by a fluid supply circuit is able to circulate,
- a movable flap mounted at the level of the air intake and displacing between an opening position allowing the circulation of the airflow into the cavity and a closing position preventing the circulation of the airflow into the cavity,
- a control device comprising at least one movable member intended to cause the displacement of the movable flap, the control device being arranged in the fluid supply circuit for supplying the fluid to the heat exchanger, and being configured so as to allows or prevent the circulation of the first fluid towards the heat exchanger and to act simultaneously on the opening or closing position of the movable flap.

Thus, this solution allows to achieve the above-mentioned objective. In particular, the coupling of the position of the movable flap and of the position of the movable member allows an adaptation to the different phases of flight of the turbine engine and of the aircraft. The use of the heat exchanger in certain flight conditions of the turbine engine allows for an increase in its service life and possibly a gain in weight. In particular, this configuration allows to avoid the overheating of the cavity in which the heat exchanger is installed, reduces the thermal cyclane of the heat exchanger and the pressure losses.

The heat exchange system also comprises one or more of the following characteristics, taken alone or in combination:
  the control device is intended to be connected, on the one hand, to a supply conduit connected to the first circuit of the heat exchanger and, on the other hand, to a bypass conduit which bypasses the heat exchanger, said supply conduit being intended to be supplied by the supply circuit when the movable flap occupies the opening position and said bypass conduit being intended to be supplied by the supply circuit when the movable flap occupies the closing position.

the movable member displaces between:
a first position allowing the circulation of the first fluid towards the heat exchanger and in which the movable flap is in the opening position, and
a second position allowing the circulation of the first fluid towards the bypass conduit and in which the movable flap is in the closing position.

the heat exchange system comprises means for measuring at least one determined parameter of the first fluid at the outlet of the heat exchanger, depending on the orientation of circulation of the first fluid in the heat exchanger, and which are capable of being connected to an electronic control unit, the electronic control unit being configured so as to drive the passage from one position to another of the movable member according to the determined parameter.

the control device comprises a body provided with a housing into which a first inlet orifice, a second inlet orifice, a first outlet orifice and a second outlet orifice open, the first and second inlet orifices being intended to be connected to the supply circuit, the first outlet orifice being intended to be connected to the first circuit and the second outlet orifice being intended to be connected to the bypass conduit, the movable member sealing the second outlet orifice in the first position and sealing the first outlet orifice in the second position.

the movable member is able to occupy at least one intermediate position in which the first fluid is able to circulate towards the heat exchanger and towards the bypass conduit.

the first fluid comprises oil.

the determined parameter of the first fluid is the temperature of the first fluid at the outlet of the heat exchanger.

the movable member comprises an actuating rod hinged to the movable flap.

The invention also relates to a turbine engine module comprising an annular compartment about the longitudinal axis X, a fluid supply circuit and a heat exchange system having any of the above characteristics, the compartment comprising an annular wall which guides at least partly an airflow, and the heat exchange system being arranged in the annular compartment and on the supply circuit, the air intake of the cavity being arranged in the annular wall so as to be in fluidic communication with the annular compartment.

The invention also relates to an aircraft turbine engine comprising a turbine engine module as described above or a heat exchange system as described above.

The invention also relates to a method for regulating the circulation of a first fluid through a heat exchanger of a heat exchange system for a turbine engine, the heat exchanger being arranged in a cavity of a compartment of the turbine engine and the cavity being capable of being swept by an airflow, the method being characterised in that it comprises:
a step of providing a first fluid into a fluid supply circuit of the turbine engine,
a step of arranging the heat exchanger and a control device on the supply circuit,
a step of regulating so as to simultaneously allow or prevent the circulation of the airflow in the cavity and the circulation of the first fluid towards the heat exchanger.

The method also comprises one or more of the following characteristics or steps, taken alone or in combination:
the regulation step comprises:
a sub-step of displacing the movable member to the first position to allow the oil to circulate towards the first circuit of the heat exchanger or to the second position to allow the oil to circulate towards the bypass conduit,
a sub-step of actuating the movable flap into an opening position allowing the airflow to circulate in the cavity and a closing position preventing the airflow to circulate in the cavity, the position of the movable flap being a function of the position of the movable member.

a step of measuring a determined parameter of the first fluid and in that the displacement step is carried out as a function of at least reaching a threshold of said predetermined parameter.

the determined parameter measured is a temperature representative of the temperature of the first fluid in the heat exchanger, measured continuously or discretely at regular intervals, and in that at each measurement the regulation step performs at least one of the following steps before a subsequent measurement of the temperature:
when the measured temperature is below at least one setpoint temperature threshold, the movable member is driven to displace to the second position so as to supply the bypass conduit with the first fluid,
when the measured temperature is equal to said setpoint temperature threshold, the movable member is driven to displace to its previous position, and/or
when the measured temperature is above said setpoint temperature threshold, the movable member is driven to displace to the first position so as to supply the supply conduit with the first fluid towards the heat exchanger.

The invention also relates to an aircraft comprising a heat exchange system or a turbine engine as described.

BRIEF DESCRIPTION OF THE FIGURES

The invention will be better understood, and other purposes, details, characteristics and advantages thereof will become clearer upon reading the following detailed explanatory description of embodiments of the invention given as purely illustrative and non-limiting examples, with reference to the appended schematic drawings in which.

DETAILED DESCRIPTION OF THE INVENTION

FIG. 1 has been described in the above.

Figure 2:
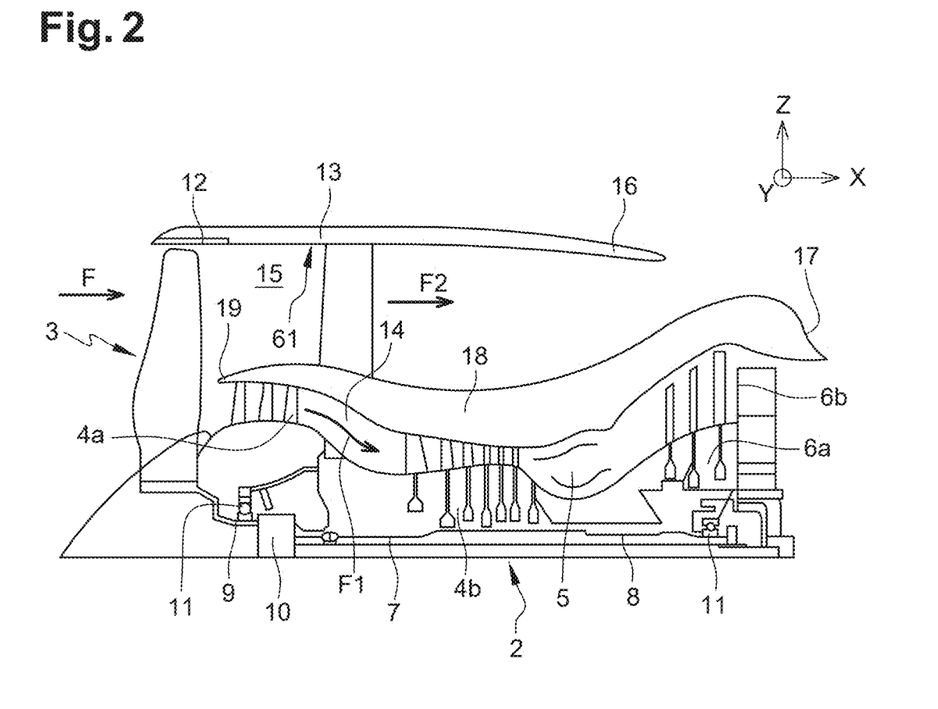
FIG. 2 is a perspective view of an example of a turbine engine to which the invention applies.

FIG. 2 shows an axial cross-sectional view of a turbine engine 1 of longitudinal axis X to which the invention applies. The turbine engine 1 shown is a turbofan engine for mounting on an aircraft. Of course, the invention is not limited to this type of turbine engine.

In the present invention, the terms "upstream" and "downstream" are defined in relation to the circulation of the gases in the turbine engine 1 and here along the longitudinal axis X and with reference to FIG. 1 from left to right. The terms "radial", "internal" and "external" are defined with respect to a radial axis Z perpendicular to the longitudinal axis X and with respect to the distance from the longitudinal axis X. Similarly, a turbine engine usually consists of several modules that are manufactured independently of each other and then assembled together in a way that facilitates its assembly, its disassembly and its maintenance.

This double-flow turbine engine 1 generally comprises a gas generator or gas turbine engine 2 with a fan 3 mounted upstream. The gas generator 2 comprises a gas compressor assembly (here comprising a low pressure compressor 4a and a high pressure compressor 4b), a combustion chamber 5 and a turbine assembly (here comprising a high pressure turbine 6a and a low pressure turbine 6b). Typically, the turbine engine comprises a low pressure shaft 7 that connects the low pressure compressor 4a and the low pressure turbine 6b to form a low pressure body and a high pressure shaft 8 that connects the high pressure compressor 4b and the high pressure turbine 6a to form a high pressure body. The low pressure shaft 7, centred on the longitudinal axis, causes a fan shaft 9 in this example. A speed reducer 10 may be interposed, as here, between the fan shaft 9 and the low pressure shaft 7. Upstream and downstream rotation guide bearings 11 allow to guide the low-pressure shaft 7 in rotation relative to a stationary structure of the turbine engine.

The fan 3 is faired in a fan casing 12 carried by a nacelle 13 and generates a primary airflow F1 which circulates through the gas generator 2 in a primary duct 14 and a secondary airflow F2 which circulates in a secondary duct 15 around the gas generator 2. The secondary airflow F2 is ejected through a secondary nozzle 16 terminating the nacelle 13 while the primary airflow F1 is ejected outside the turbine engine via an ejection nozzle 17 located downstream of the gas generator 2.

The guide bearings 11 and the speed reducer 10 in this example turbine engine configuration need to be lubricated and/or cooled to ensure good performance of the turbine engine. The power generated by these is dissipated in a fluid coming from a fluid supply source installed in the turbine engine, which allows to lubricate and/or cool various members and/or equipment of the turbine engine. Of course, other items of equipment of the turbine engine generates a lot of heat that must be extracted from its environment.

Figure 3:
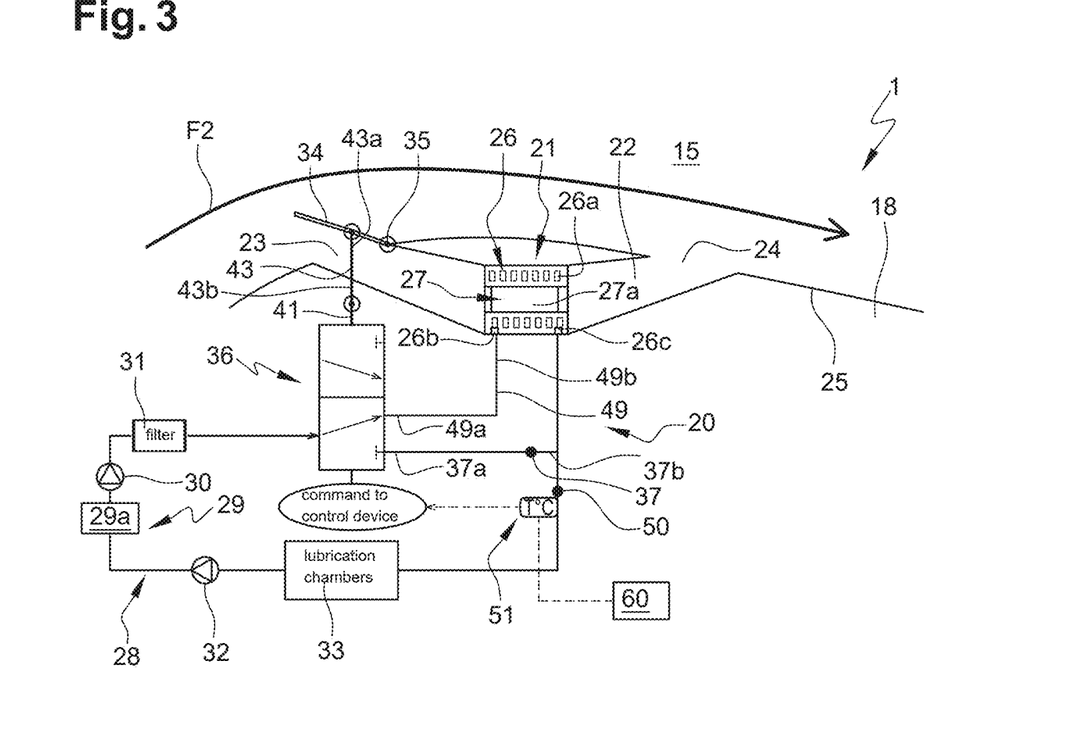
FIG. 3 is a schematic and axial cross-sectional view of a heat exchange system mounted in a turbine engine module, the heat exchange system comprising a buried heat exchanger according to the invention.

With reference to FIGS. 2 and 3, the turbine engine 1 comprises a heat exchange system 20 which allows the cooling of the fluid intended to lubricate and/or cool these members and/or items of equipment. The heat exchange system 20 comprises a heat exchanger 21 shown very schematically. The heat exchanger 21 is mounted in a compartment in which an airflow circulates. The compartment may be an inter-duct casing 18, the fan casing 12 or the nacelle 13. The inter-duct casing 18 separates the primary duct 14 and the secondary duct 15. This inter-duct casing 18 carries a splitter nose 19 upstream and the ejection nozzle 17 of the gases downstream.

In FIG. 3, the heat exchanger 21 is arranged in a cavity 22, around the longitudinal axis, which is intended to be passed through by an airflow, in particular the secondary airflow F2. In the present example, the cavity 22 is arranged in the inter-duct casing 18. The cavity 22 comprises an air intake 23 which is in fluidic communication with the secondary duct 15. The cavity 22 also comprises an air exhaust 24 which is in fluidic communication with the secondary duct 15. In the example shown, the air intake 23, as well as the air exhaust 24 are formed in a radially internal wall 25 of the inter-duct casing 18. The radially internal wall 25 is intended to guide at least partly the secondary airflow F2 into the secondary duct 15. The cavity 22 also extends over an angular sector, in a circumferential direction about the longitudinal axis X, of the order of 30°.

The heat exchanger 21 comprises a first circuit 26 in which a first fluid is able to circulate and a second circuit 27 in which a second fluid is able to circulate. The first fluid is an oil and the second fluid is the airflow circulating in the turbine engine and in this case a portion of the secondary airflow collected from the secondary duct 15. The airflow is the cold source intended to cool the hot oil heated by the members/equipment of the turbine engine. The heat exchanger 21 is of the air/oil surface type.

Several oil channels 26a are arranged in the thickness of an internal wall and an external wall along the radial axis in the heat exchanger 21. These oil channels 26a communicate with each other and form the first circuit 26. The latter comprises an inlet 26b and an outlet 26c. The second circuit 27 extends between the internal and external walls of the heat exchanger 21. These walls are radially spaced from each other forming a channel. The air flow circulates through the channel. Each of the walls comprising the channels 26a is swept by the airflow so as to carry out an exchange with them. The heat exchanger 21 may comprise a plurality of fins 27a each extending radially from at least one of the internal and external walls. The fins allow to increase the contact area with the secondary airflow to extract calories.

The heat exchanger 21 is mounted on a fluid (oil) supply circuit 28 of the turbine engine 1. The oil supply circuit 28 comprises, generally and in the orientation of flow of the oil, an oil source 29, at least one supply pump 30 intended to allow the circulation of oil in the supply circuit 28 from the oil source 29, at least one filter 31, and at least one recirculation pump 32. The oil source 29 here comprises a tank 29a. The heat exchanger 21 is typically arranged downstream of the supply pump 30 and also upstream of the members and/or equipment to be lubricated and/or cooled. These are typically located in lubrication chambers 33. The recirculation pump 32 allows oil to be recirculated from the members and/or equipment towards the tank 29a. The first circuit 26 of the heat exchanger is a segment of the supply circuit 28.

The heat exchange system 20 further comprises a driven scoop 34, formed by a movable flap, to allow or prevent the circulation of a portion of the secondary airflow into the cavity 22 and in particular through the heat exchanger 21. The movable flap 34 is arranged at the level of the air intake 23 of the cavity 22. Specifically, the movable flap 34 is displaceable between an opening position in which the airflow is allowed to circulate into the cavity (and also into the compartment or around the inter-duct casing 18) and a closing position in which the airflow is not allowed to circulate into the cavity 22 (the airflow only circulates into the compartment or around the inter-duct casing (i.e. into the secondary duct 15).

Advantageously, the movable flap 34 is mounted so as to pivot about an axis 35 transverse to the longitudinal axis X. A pivot connection is provided between the movable flap 34 and a segment of the radially internal wall 25 of the inter-duct casing 18. The movable flap 34 also has dimensions substantially corresponding to those of the air intake 23. In particular, the movable flap 34 extends over an angular sector of the order of 30° in the circumferential direction.

As can be seen in FIG. 3, the heat exchange system 20 comprises a control device 36 which is configured to act (prevent or allow) on the circulation of the first fluid (oil), towards the heat exchanger 2 (i.e. in the first oil circuit) and simultaneously on the position of the movable flap 34. More specifically, the control device 36 is configured to associate the closing position of the movable flap 34 with a bypass conduit 37 bypassing the heat exchanger 21 to avoid a temperature rise in it and in the cavity 22. The control device 36 is arranged in the supply circuit 28.

Figure 4:
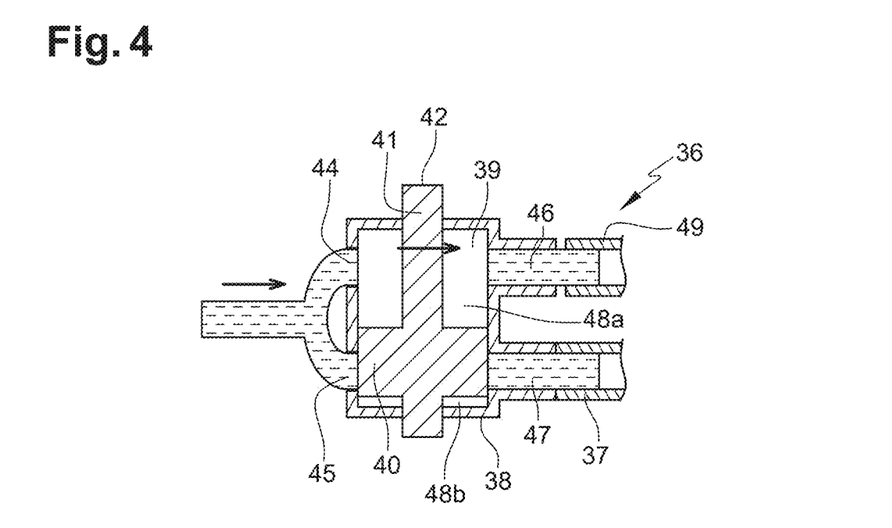
FIG. 4 schematically illustrates an example of a control device intended to act on a movable flap and being in a position to allow the circulation of a fluid towards a heat exchanger according to the invention.

With reference to FIG. 4, the control device 36 is in the form of a distribution valve which comprises a body 38 provided with a housing 39 or bore and a movable member 40 displacing in the housing 39 between a first position allowing oil to circulate towards the heat exchanger 21 and a second position allowing oil to circulate into the bypass conduit 37. In particular, in the second position, the oil is not allowed to circulate towards the heat exchanger 21. The movable member 40 is intended to cause or actuate the displacement of the movable flap 34. For this purpose, the movable member 40 comprises an actuating rod 41, the free end 42 of which is hingedly attached to the movable flap. The actuating rod 41 extends at least partly outside the body 38. In this way, when the movable member 40 is displaced from its first position to its second position, the latter causes the movable flap 34 to displace into the opening or closing position. According to an example of embodiment not shown, the free end 42 of the actuating rod 41 is directly hinged to the movable flap. Alternatively, and as illustrated in FIG. 3, a connecting rod 43 comprises a first end 43a which is hingedly attached to the movable flap 34 and a second end 43b which is attached to the free end 42 of the actuating rod 41 of the movable member 40. In yet another alternative (not shown), a connecting rod and a movable part are arranged between the movable flap 34 and the movable member 40 for changing the position of the movable flap. In particular, the first end of the connecting rod is hinged to the movable flap 34 and the second end of the connecting rod is hinged to the movable part. The latter, for example in the form of an angle, pivots around an axis transverse to the longitudinal axis of the turbine engine. The movable part is also hinged to the free end of the actuating rod 41.

Figure 5:
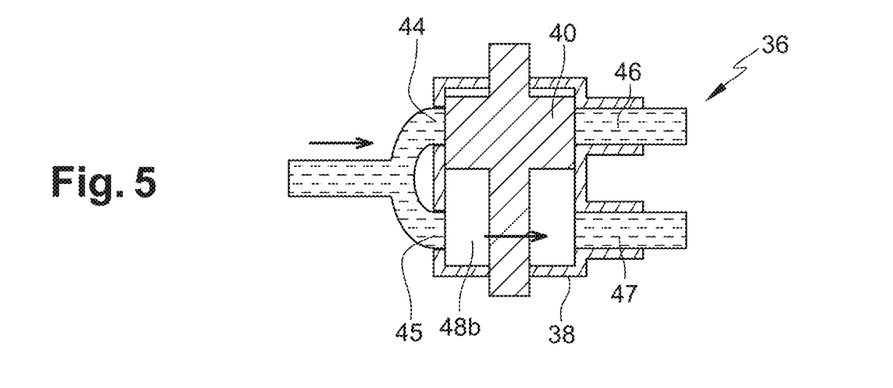
FIG. 5 schematically illustrates an example of a control device intended to act on a movable flap and being in a position preventing the circulation of a fluid in a heat exchanger according to the invention.

With reference to FIGS. 4 to 5, the control device 36 is intended to be connected, on the one hand, to a first supply conduit 49 connected to the first circuit 26 of the heat exchanger 21 and, on the other hand, to the bypass conduit 37 which bypasses the heat exchanger 21. In particular, the body 38 comprises a first inlet orifice 44, a second inlet orifice 45, a first outlet orifice 46 and a second outlet orifice 47 opening into the housing 39. The first and second inlet orifices 44, 45 are intended to be connected to the supply circuit 28. The first outlet orifice 41 is intended to be connected to the first circuit 26 of the heat exchanger 21. The movable member 40 defines a first chamber 48a and a second chamber 48b in the body 38 which are hermetically separated. The volume of the chambers 48a, 48b varies as the movable member 40 displaces within the body 38. In the present example, the movable member 40 displaces in a translational manner. As illustrated, the first inlet orifice 44 is in fluidic communication with the first chamber 48a. The first outlet orifice 46 is also in fluidic communication with the first chamber 48a. The first supply conduit 49 is arranged on the supply circuit 28 so as to connect the first circuit 26 of the exchanger 21 to the control device 36. The conduit 49 comprises an inlet 49a connected to the first outlet orifice 46 of the device 36 and an outlet 49b connected to the inlet 26b of the first circuit 26 of the heat exchanger 21.

The second inlet orifice 45 is in fluidic communication with the second chamber 48b. The second outlet orifice 47 is also in fluidic communication with the second chamber 48b. The bypass conduit 37 comprises an inlet 37a which is connected to the second outlet orifice 47 of the control device 36. This bypass conduit 37 also comprises an outlet 37b which is arranged downstream of the heat exchanger (downstream of the outlet 26c of the first circuit 26). More specifically, the outlet 37b is arranged between the tank 29a and the heat exchanger 21. The output 26c of the first circuit 26 is coupled to a second conduit 50 of the supply circuit 28.

The displacement of the movable flap 34 is coupled to the fluid circulation in the bypass conduit so as to avoid the overheating of the cavity 22 in which the heat exchanger 21 is arranged and also to the fluid circulation in the heat exchanger 21 itself (in the first circuit). For this purpose, when the movable member 40 is in the first position (oil circulation in the first circuit 26), the movable flap 34 is in the opening position. In this case, the oil circulating through the heat exchanger 21 is cooled by a portion of the secondary airflow passing through the heat exchanger 21. In this position, as shown in FIG. 4, the movable member 40 seals the second inlet orifice 45 and also the second outlet orifice 47.

Conversely, when the movable member 40 of the control device 36 is in the second position (oil circulation in the bypass conduit 37 then the movable flap 34 is in the closing position. No portion of the secondary airflow is collected from the secondary duct 15, which optimises the performance of the turbine engine, and the hot oil coming from the members and/or equipment to be lubricated and/or cooled is redirected towards the tank 29a so as to avoid a rise in temperature in the heat exchanger 21 and in the cavity 22. In this position, as shown in FIG. 5, the movable member 40 seals the first inlet orifice 44 and also the first outlet orifice 46.

Advantageously, the heat exchange system 20 comprises means for measuring 51 at least one determined parameter of the first fluid (oil) in the turbine engine 1. The measuring means 51 are connected to an electronic control unit 60 of the turbine engine. This electronic control unit 60 is configured to drive the passage from one position to another of the movable member 40 of the control device 36 according to the determined parameter. The means 51 for measuring the determined parameter may be a sensor, a probe, a thermocouple or any element capable of measuring a determined parameter in the turbine engine. The temperature of the oil leaving the heat exchanger 21 is an example of a determined parameter. The viscosity of the oil can also be measured. As shown in FIG. 3, the measuring means 51 are installed in the conduit 50 of the oil supply circuit 28 and downstream of the heat exchanger 21. The electronic control unit 60 delivers a control command to the control device 36 when the measured temperature is higher, lower or reaches at least one temperature threshold to change from one position to another. Advantageously, but not restrictively, the temperature threshold is between 20° C. and 100° C. The temperature threshold is stored in a memory (not shown) in the electronic control unit 60. The first position of the movable member (opening position of the movable flap) is considered to be a default position. That is, when the turbine engine is started, the movable flap 34 is opened or opens and oil circulates towards the heat exchanger 21. When the measured temperature reaches or falls below the temperature threshold, the movable member 40 moves to the second position to close the movable flap 34 and allow the oil to circulate towards the bypass conduit 37.

Alternatively, several temperature thresholds are stored in the memory of the electronic control unit 60. A first temperature threshold is associated with the first position of the movable member 40 or of the opening position of the movable flap 34. A second threshold is associated with the second position of the movable member 40 or of the closing position of the movable flap 34. The first temperature threshold may be 20° C. and the second temperature threshold may be 100° C.

Figure 6:
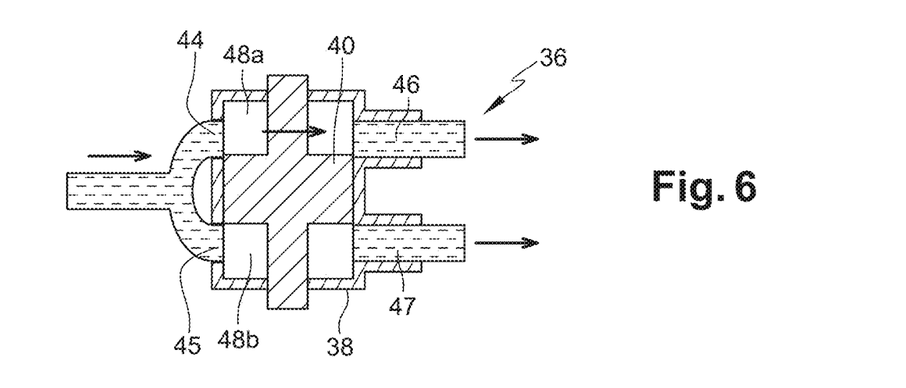
FIG. 6 is a schematic view of an example of a control device allowing the fluid to circulate towards a heat exchanger and towards a bypass conduit bypassing the heat exchanger, the flow rate of fluid allowed to circulate being identical according to the invention.

In an embodiment illustrated in FIG. 6, the movable member 40 of the control device 36 may occupy an intermediate position. In this case the movable flap 34 has an intermediate opening angle in an intermediate position as well. In this example, the intermediate position is located between the first position and the second position. The control device 36 is configured to have an oil flow rate at its output that is specific to each position of the movable flap. In particular, when the movable flap 34 is in the opening position, the entire oil flow rate circulates towards the heat exchanger 21. When the movable flap 34 is in the closing position, all the oil flow rate circulates towards the bypass conduit 37. In the intermediate position, the control device 36 simultaneously allows the oil to circulate towards the heat exchanger 21 and towards the bypass conduit 37. The oil flow rate towards the heat exchanger 21 is identical to the oil flow rate towards the bypass conduit 37. The movable flap 34 also occupies its intermediate position between the opening position and the closing position. The first and second inlet orifices 44, 45 and the first and second outlet orifices 46, 47 are not sealed. Similarly, the intermediate position of the control device 36 is associated here with a third temperature threshold. The latter is between the first threshold and the second threshold of temperature. Advantageously, the values of the different thresholds are spaced apart or respect a certain hysteresis to avoid flapping (oscillations) of the movable flap 34. For example, the third temperature threshold is 80° C.

Figure 7:
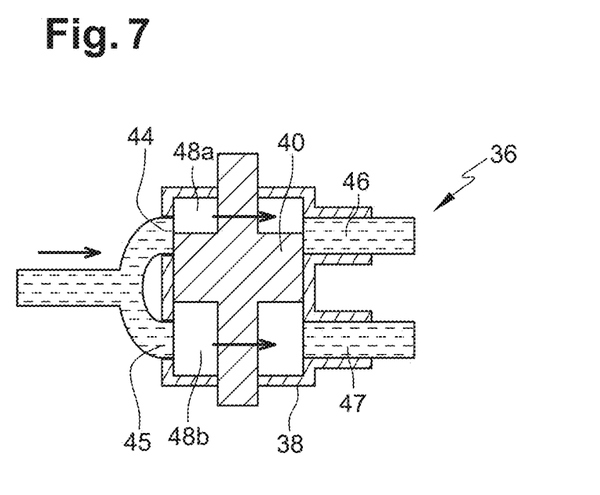
FIG. 7 is another embodiment of a control device allowing oil to circulate towards a heat exchanger and towards a bypass conduit bypassing the heat exchanger, the flow rate of fluid allowed to circulate being different according to the invention.

Alternatively, as shown in FIG. 7, when the control device 36 switches to the intermediate position, the oil flow rate circulating towards the heat exchanger 21 is less than the oil flow rate towards the bypass conduit 37. The oil flow rate towards the heat exchanger 21 may be 25% of the total oil flow rate entering into the control device 36 while the oil flow rate towards the bypass conduit 37 may be 75% of the total flow rate. For this purpose, the first inlet orifice 44 and the first outlet orifice 46 are partially sealed. Of course, the percentage of the flow rate distributed can be different.

Advantageously, but not restrictively, the control device 36 is a hydraulic distributor which is mounted on the supply circuit 28 of the turbine engine. The distributor comprises a drawer as a movable member.

Figure 8:
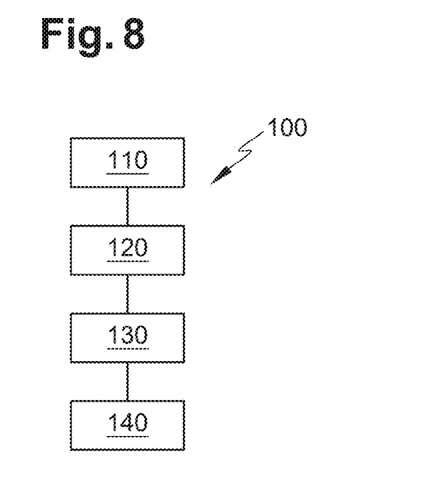
FIG. 8 illustrates the main steps of a method for regulating a fluid in a heat exchanger installed in a cavity of a compartment of the turbine engine according to the invention.

An example of a method 100 for regulating the circulation of the oil in the heat exchanger 21 of the heat exchange system 20 as described above will be presented. The steps of the method are shown in FIG. 8. The method comprises a first step of providing 110 a first fluid (in this case oil) to a supply circuit 28. The method also comprises, before or after step 110, a step of arranging 120 the heat exchanger 21 and a control device 36 on the supply circuit 28. As we have seen and in particular in FIG. 3, the control device 36 is arranged, following the circulation of the first fluid in the supply circuit 28, between the heat exchanger 21 and the tank 29*a* (or fluid source). The method 100 comprises a step of regulating or managing 130 differentially (allowing or preventing) and simultaneously the circulation of the airflow in the cavity 22 and the circulation of the first fluid towards the heat exchanger 21. The regulation step 130 comprises a sub-step 131 of displacing the movable member 40 into the first position to allow the oil to circulate towards the first circuit 26 of the heat exchanger 21 (via the supply conduit 49) or into the second position to prevent the oil circulation towards the heat exchanger 21. In the second position, the oil is returned towards the tank without passing through the heat exchanger 21. This step 130 also comprises a sub-step of actuating 132 the movable flap 34 which is dependent on the position of the movable member 40. In the first position of the movable member 40, the movable flap 34 occupies the opening position to allow the circulation of the airflow into the cavity 22. And in the second position of the movable member 40, the movable flap 34 occupies the closing position to prevent the circulation of the airflow into the cavity. In particular, when the movable flap 34 occupies the opening position, the supply conduit 49 is supplied by the supply circuit 28 and when the movable flap 34 occupies the closing position the bypass conduit 37 is supplied by the supply circuit 28.

The change in position of the movable member 40 depends on a predetermined parameter of the first fluid. To this end, the method 100 also comprises a step of measuring 140 a determined parameter (the temperature in or at the outlet of the heat exchanger) of the first fluid to carry out the displacement sub-step. For this purpose, the measuring means 51 send information about the temperature of the oil leaving the heat exchanger 21. Each measured temperature is compared with the temperature threshold or thresholds stored in the memory of the electronic control unit 60. When the measured temperature reaches, falls below or exceeds one of the temperature thresholds, the electronic control unit 60 sends a control command to the control device 36. In particular, the control command drives the displacement of the movable member 40 into the first position, into the second position, into its holding position or possibly into the intermediate position. For example, the temperature of the first fluid in the heat exchanger, or at the outlet of the heat exchanger, is measured continuously or discretely at regular intervals. The regulation step performs, at least before a subsequent measurement of the temperature, a step consisting of the fact that when the measured temperature is lower than at least one setpoint temperature threshold, the movable member 40 is driven to displace into the second position so as to supply the bypass conduit 37 with the first fluid. The regulation step may perform, at least prior to a subsequent measurement of the temperature, a step consisting of the fact that when the measured temperature is equal to said setpoint temperature threshold, the movable member 40 is driven to displace to its previous position. The regulation step may perform, at least prior to a subsequent measurement of the temperature, a step consisting of the fact that when the measured temperature is above said setpoint temperature threshold, the movable member 40 is driven to displace to the first position so as to supply the supply conduit 49 with the first fluid towards the heat exchanger.

Thus, the closing of the movable flap 34 and the circulation of the oil through the bypass conduit 37 (bypassing the heat exchanger 21) allows to reduce the thermal cycling in the heat exchanger and to reduce the pressure losses in the first oil circuit. Such reductions allow to a gain in the service life of the heat exchanger, and also in the performance and the efficiency of it and other members of the supply circuit 28. Similarly, the temperature to be borne by the cavity 22 can be weighted so as to obtain mass gains in the materials used (e.g. composites), particularly for the walls of the cavity 22 and those of the exchanger 21.

The invention claimed is:

1. A heat exchange system for an aircraft turbine engine, the heat exchange system comprising:
    a cavity having an air intake;
    a heat exchanger arranged in the cavity, the heat exchanger comprising a first circuit through which a first fluid provided by a fluid supply circuit is able to circulate;
    a movable flap mounted proximate the air intake and movable between an open position permitting the circulation of the airflow into the cavity towards the heat exchanger and a closed position preventing the circulation of the airflow into the cavity; and
    a control device comprising at least one movable member intended to move the movable flap between the open and closed positions, the at least one movable member being distinct from the movable flap,
    wherein the control device is arranged in the fluid supply circuit supplying fluid to the heat exchanger, and wherein the control device is configured so as to permit or prevent the circulation of the first fluid towards the heat exchanger and to simultaneously move the movable flap between the open and closed positions,
    wherein the move of the movable member between a first position and a second position leads to the move of the movable flap between the open and closed positions.

2. The heat exchange system of claim 1, wherein the control device is configured to connect, on the one hand, to a supply conduit connected to the first circuit of the heat exchanger and, on the other hand, to a bypass conduit which bypasses the heat exchanger, the supply conduit being configured to be supplied by the supply circuit when the movable flap is in the open position and the bypass conduit being configured to be supplied by the supply circuit when the movable flap is in the closed position.

3. The heat exchange system of claim 2, wherein the movable member moves between at least:
    the first position permitting the circulation of the first fluid towards the heat exchanger and in which the movable flap is in the open position, and
    the second position permitting the circulation of the first fluid towards the bypass conduit and in which the movable flap is in the closed position.

4. The heat exchange system of claim 3, further comprising means for measuring at least one determined parameter of the first fluid at the outlet of the heat exchanger, depending on a circulation orientation of the first fluid in the heat exchanger, wherein the means for measuring at least one determined parameter are capable of being connected to an electronic control unit, the electronic control unit being configured so as to move the movable member as a function of the determined parameter.

5. The heat exchange system of claim 3, wherein the control device comprises a body having a housing into which a first inlet orifice, a second inlet orifice, a first outlet orifice, and a second outlet orifice open, the first and second inlet orifices being configured to be connected to the supply circuit, the first outlet orifice being configured to be connected to the first circuit, and the second outlet orifice being configured to be connected to the bypass conduit, the movable member sealing the second outlet orifice in the first position and sealing the first outlet orifice in the second position.

6. The heat exchange system of claim 3, wherein the movable member is adapted to occupy at least one intermediate position in which the first fluid is adapted to circulate towards the heat exchanger and towards the bypass conduit.

7. A turbine engine module, comprising:
    an annular compartment around a longitudinal axis; and
    the fluid supply circuit and the heat exchange system according to claim 1, the compartment comprising an annular wall which at least partially guides an airflow, the heat exchange system being arranged in the annular compartment and on the supply circuit, the air intake of the cavity being arranged in the annular wall so as to be in fluidic communication with the annular compartment.

8. An aircraft turbine engine comprising a turbine engine module of claim 7.

9. A method for regulating the circulation of a first fluid through a heat exchanger of a heat exchange system for an aircraft turbine engine, the heat exchanger being arranged in a cavity of the heat exchange system and the cavity being capable of being swept by an airflow circulating from an air intake of the cavity, the method comprising:
    providing a first fluid into a fluid supply circuit of the turbine engine;
    arranging the heat exchanger and a control device on the supply circuit, the control device comprising a movable member intended to move a movable flap mounted proximate the air intake between an open position permitting the circulation of the airflow in the cavity and a closed position preventing the circulation of the airflow in the cavity, wherein the move of the movable member between a first position and a second position leads to the move of the movable flap between the open and closed positions; and
    regulating so as to permit or prevent the circulation of the airflow in the cavity and the circulation of the first fluid towards the heat exchanger and to simultaneously move the movable flap between the open and closed positions.

10. The method of claim 9, wherein the step of regulating further comprises:
    moving the movable member to the first position to permit the oil to circulate towards the first circuit of the heat exchanger or to the second position to permit the oil to circulate towards the bypass conduit, and
    actuating the movable flap in the open position permitting the airflow to circulate in the cavity and the closed position preventing the airflow from circulating in the cavity, the position of the movable flap being a function of the position of the movable member.

11. The method of claim 10, further comprising measuring a determined parameter of the first fluid, wherein the moving step is carried out as a function of at least the reaching of a threshold of the predetermined parameter.

12. The method of claim 11, wherein the determined parameter measured is a temperature representative of the temperature of the first fluid in the heat exchanger, the determined parameter is measured continuously or discretely at regular intervals, and wherein the regulating step performs at least one of the following steps prior to a measurement of the temperature:

when the measured temperature is below at least one setpoint temperature threshold, the movable member is moved to displace to the second position so as to supply the bypass conduit with the first fluid, when the measured temperature is equal to the setpoint temperature threshold, the movable member is moved to displace to its previous position, and/or when the measured temperature is above the setpoint temperature threshold, the movable member is moved to displace to the first position so as to supply the supply conduit with the first fluid towards the heat exchanger.

13. An aircraft turbine engine comprising a heat exchange system according to claim 1.

14. The heat exchange system according to claim 1, wherein the heat exchanger comprises a second circuit in which a second fluid is able to circulate, the second fluid being the air circulating in the cavity.

15. The heat exchange system according to claim 1, wherein the control device is arranged between the movable flap and the first circuit.

16. The heat exchange system according to claim 2, wherein the control device comprises a distribution valve which comprises a body having a housing and the movable member displacing in the housing, between: a first position allowing oil to circulate towards the heat exchanger; and a second position allowing oil to circulate into the bypass conduit.

17. The heat exchange system according to claim 1, wherein the move of the movable member depends on a threshold of a predetermined parameter of the first fluid.

18. The heat exchange system according to claim 1, wherein the movable member comprises an actuating rod which has a free end hingedly attached to the movable flap.

19. A heat exchange system for an aircraft turbine engine, the heat exchange system comprising:

a cavity having an air intake;

a heat exchanger arranged in the cavity, the heat exchanger comprising a first circuit through which a first fluid provided by a fluid supply circuit is able to circulate;

a movable flap mounted proximate the air intake and movable between an open position permitting the circulation of the airflow into the cavity towards the heat exchanger and a closed position preventing the circulation of the airflow into the cavity; and a control device comprising at least one movable member intended to move the movable flap between the open and closed positions, the at least one movable member being distinct from the movable flap, wherein the control device is arranged in the fluid supply circuit supplying fluid to the heat exchanger, wherein the control device is configured so as to permit or prevent the circulation of the first fluid towards the heat exchanger and to simultaneously move the movable flap between the open and closed positions, and wherein the position of the movable flap depends on the position of the movable member.

* * * * *